United States Patent [19]

Vissers et al.

[11] 4,366,877
[45] Jan. 4, 1983

[54] POWER TRANSFERRING COUPLING DEVICE FOR A TRACTOR AND AN IMPLEMENT HITCHED THERETO

[75] Inventors: Hermanus H. Vissers; Gijsbert J. Mijnders, both of Nieuw-Vennep, Netherlands

[73] Assignee: Multinorm B.V., Nieuw-Vennep, Netherlands

[21] Appl. No.: 195,172

[22] Filed: Oct. 8, 1980

[30] Foreign Application Priority Data

Oct. 11, 1979 [NL] Netherlands .................... 7907546

[51] Int. Cl.³ .............................................. B60K 25/06
[52] U.S. Cl. ................................. 180/53 R; 172/125
[58] Field of Search ............... 180/53 R, 53 C, 53 D, 180/14 B; 172/74, 47, 98, 99, 125, 117, 96

[56] References Cited

U.S. PATENT DOCUMENTS

| | | | |
|---|---|---|---|
| 1,661,737 | 3/1928 | Raimer | 180/14 B |
| 2,335,510 | 11/1943 | Hansen | 172/47 X |
| 2,489,633 | 11/1949 | Folgham | 172/74 X |
| 3,200,890 | 8/1965 | Courtway | 172/47 X |
| 3,576,227 | 4/1971 | Lippl | 172/47 X |

FOREIGN PATENT DOCUMENTS

| | | | |
|---|---|---|---|
| 108592 | 10/1939 | Australia | 180/14 B |
| 330021 | 7/1958 | Switzerland | 180/53 R |
| 608120 | 9/1948 | United Kingdom | 180/14 B |

*Primary Examiner*—John A. Pekar
*Attorney, Agent, or Firm*—Diller, Ramik & Wight

[57] ABSTRACT

A device for coupling an implement drawn along on the ground with a tractor and for transferring driving power from the power take-off shaft of the tractor to the implement coupled herewith, said device comprising a carrier for a transmission, preferably gear transmission, of at least two portions relatively rotatable about an upwardly extending axis, the input shaft of said transmission coupled with the power take-off shaft being journalled in one portion of the carrier, whilst the second portion of the carrier is coupled with the agricultural implement, said input shaft being further journalled in a support provided with coupling members such that the support can be tilted about a pivotal axis extending transversely of the input shaft in its connection with the tractor.

23 Claims, 11 Drawing Figures

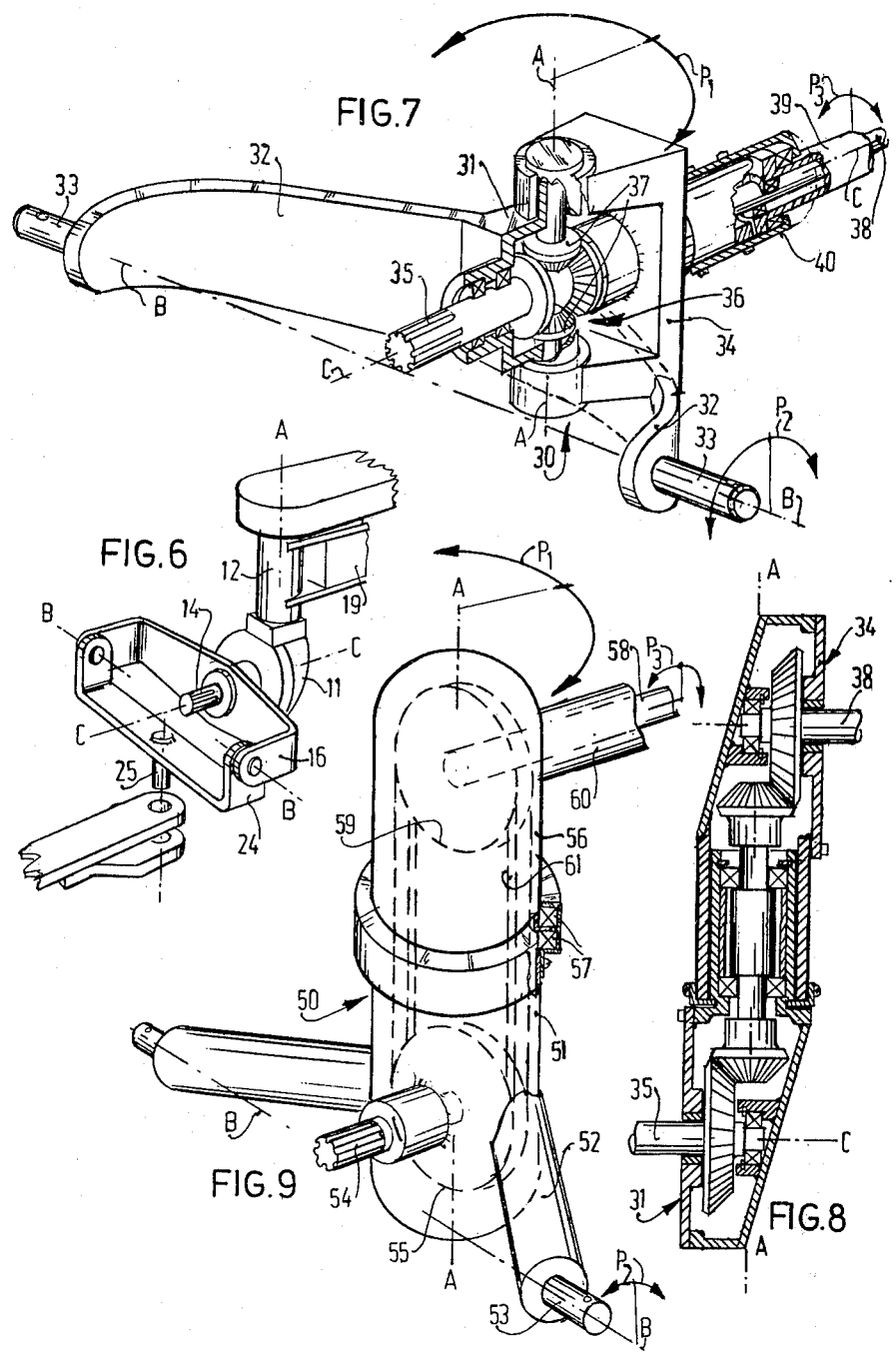

POWER TRANSFERRING COUPLING DEVICE FOR A TRACTOR AND AN IMPLEMENT HITCHED THERETO

BACKGROUND OF THE INVENTION

The invention relates to a device for coupling an implement drawn along on the ground with a tractor and for transferring driving power from the power take-off shaft of the tractor to the implement coupled herewith.

It is common practice to couple implements having, at least in the operational state, a fixed supporting point on the ground, for example, wheels or drag members, with the drawhook or the three-point lift of a tractor, the agricultural implement being driven via a coupling or propeller shaft between the power take-off shaft of the tractor and the input shaft of the implement. The disadvantage of the use of a propeller shaft is that the implement can be arranged behind the tractor only at strictly limited angles, the angle being determined by the or each universal joint in the coupling shaft. Therefore when driving though bends, for example, at the head of a field to be worked, where the agricultural tractor and the agricultural implement have to follow a different track, the driver has to switch off the drive of the agricultural implement in order to avoid damage of the driving mechanism. In addition, even by normal use the propeller shaft is subject to comparatively heavy wear due to the constant variation of the angle or the distance between the tractor and the agricultural implement as a result of unevennesses of the ground or of working on a talus. For road transport the propeller shaft has usually to be removed.

BRIEF SUMMARY OF THE INVENTION

The invention has for its object to provide a transmission device which ensures greater freedom of movement of the hitched agricultural implement without an increase in wear of the transmission between tractor and implement, even on the contrary wear can be drastically reduced.

The device according to the invention is distinguished in that it comprises a carrier for a transmission of at least two portions relatively about an upwardly extending axis, the input shaft of said transmission coupled with the power take-off shaft being journalled in one portion of the carrier, whilst the second portion of the carrier is coupled with the agricultural implement.

The idea of the invention is based on the fact that the tractive force or the driving force are now no longer transferred separately to the agricultural implement, but they are transferred through a unitary device in which the carrier consisting of relatively pivotable portions absorbing the tractive force and transferring the driving force can be adjusted to the optimum.

In order to ensure the freedom of movement in a vertical sense it is preferred to journal the input shaft of the transmission in a support provided with coupling members such that the support can be tilted about a pivotal axis extending transversely of the input shaft in its connection with the tractor.

If the input shaft is provided with a universal joint, the coupling members according to the invention are arranged on the support in a manner such that the pivotal axis passes through or substantially through the centre of the universal joint, it being thus ensured that the distance between the power take-off shaft of the tractor and the universal joint does not or substantially not vary, so that a shaft there between, which may be telescopic, is exposed to minimum wear.

The coupling members of the support forming the hinge are preferably constituted by pivot pins inserted into the eyelets of the lower lifting arms of the three-point lift of the agricultural tractor.

In one embodiment the first portion of the carrier for the transmission and the support may be a single solid unit so that a rugged structure is obtained.

The transmission preferably comprises a rightangle gear wheel transmission, by which large angular deflections of the implement with respect to the tractor are allowed.

The invention furthermore relates to a combination of an agricultural tractor and an agricultural implement hitched thereto by the device described above. The invention suggests to use in this combination means for a vertical limitation of the movement of the support of the transmitting device. The limiting means provided on the tractor can ensure that the lower lifting arms of the three-point lifting device cannot move in a horizontal, transverse direction.

Finally, said combination may comprise a drawbar between the transmitting device and the agricultural implement, said drawbar being rotatably journalled in one embodiment in the second portion of the carrier of the transmission, whereas on the other hand said drawbar is adjustably and fixably secured to the agricultural implement.

The invention will be described more fully with reference to a few embodiments of the transmitting device shown in the Figures.

BRIEF DESCRIPTION OF THE DRAWING FIGURES

The drawing shows in

FIGS. 1, 2 and 3 a side elevation, a plan view and a rear view respectively of a combination comprising a tractor and an agricultural implement hitched thereto via a transmitting device as shown in FIGS. 4 and 5.

FIG. 4 a perspective view if a first embodiment of a transmitting device,

FIG. 5 a vertical sectional view of the device of FIG. 4,

FIG. 6 an alternative embodiment of the device of FIG. 4,

FIG. 7 a perspective view of a second embodiment of the transmitting device,

FIG. 8 an alternative embodiment of the device of FIG. 7,

FIG. 9 a perspective view like FIG. 4 or 7 of a third embodiment of the transmitting device.

FIG. 10 a plan view of an agricultural implement and a drawbar connected in or near the middle to said implement.

FIG. 11 a side elevation of the coupling device having a support means.

DETAILED DESCRIPTION OF THE INVENTION

Figures 1, 2, 3:
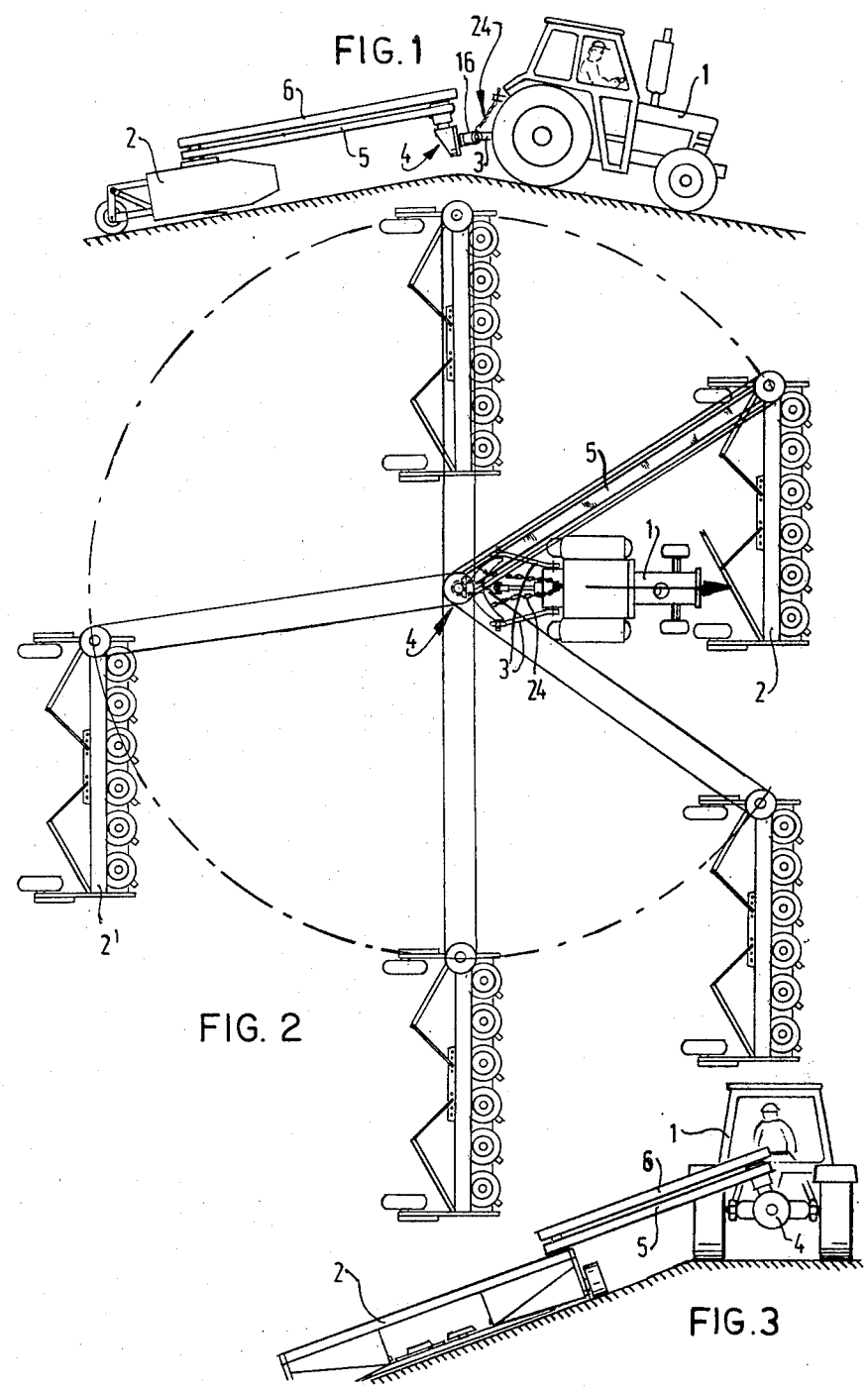

The combination shown in FIGS. 1,2 and 3 comprises an agricultural tractor 1 and an agricultural implement 2 hitched thereto. To the lower lifting arms of the three-point lifting device 3 of the tractor is pivoted the transmitting device 4 according to the invention, said transmitting device being further explained with reference to FIGS. 4 and 5. With the transmitting device 4 is coupled a drawbar 5, above which a drive in the form of a rope transmission 6 is arranged.

From FIGS. 2 and 3 it will be apparent that the agricultural implement 2 has to be settable in various positions relative to the tractor 1, whereas FIG. 3 shows that the agricultural implement can operate on a talus. These possibilities require an omnidirectionally pivotable transmitting device.

Figure 4:
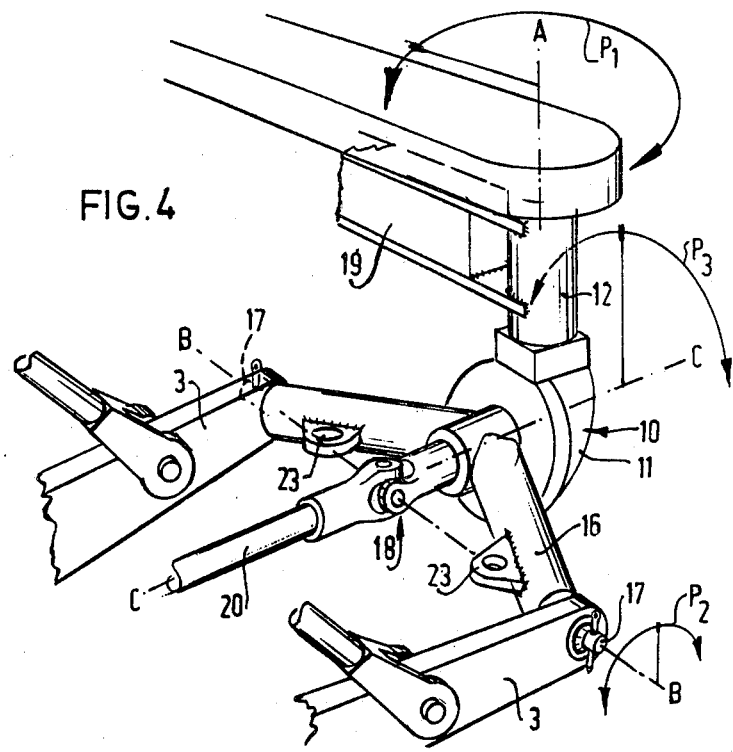
Figure 5:
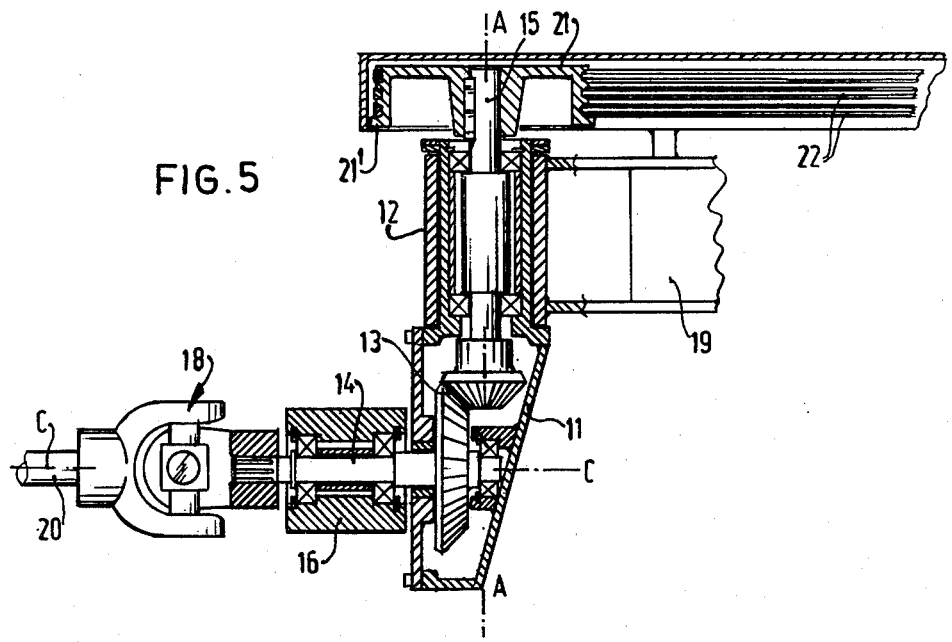

The device shown in FIGS. 4 and 5 mainly consist of a carrier 10, in which a transmission is arranged and which comprises a first portion 11 and a second portion 12. The first portion is mainly formed by a closed housing accomodating a transmission in the form of a right-angle transmission 13. The top side of the housing is prolonged and has a cylindrical shape. The second portion 12 of the carrier is constructed in the form of a cylindrical sleeve fitting to the cylindrical part of the housing 11 so that with respect to the portion 11 the second portion 12 is rotatable about the line A—A. The input shaft 14 of the transmission is journalled in the first portion 11 and the output shaft 15 of the transmission is journalled in the cylindrical upper part of the housing 11.

The housing 11 is furthermore arranged in a support 15 of V-shaped form. The ends of the two limbs of the V-shaped support are each provided with two stub shafts 17, which can be inserted into the eyelets of the lower lifting arms of the three-point lifting device 3 of the agricultural tractor 1.

The end of the input shaft 14 remote from the housing 11 has fastened to it a universal joint 18 and from FIG. 4 it will be seen that the stub shafts 17 and the centre of the universal joint 18 are located on one line B—B.

Since the input shaft 14 is rotatably journalled in the support 16, the housing is capable of tilting about the line C—C in FIG. 4.

A drawbar 19 is fastened to a portion 12 of the carrier 10 and from the foregoing description it will be apparent that owing to the orthogonal pivotal lines A—A, B—B and C—C the drawbar 19 has an omnidirectional freedom of movement with respect to the tractor, that is to say, along the lines P1, P2 and P3 respectively. This results in that the hitched implement can occupy any position relative to the tractor 1.

The power-transfer from the tractor takes place through the transmission 13, the power take-off shaft of the tractor being coupled by way of the propeller shaft 20 with the input shaft 14, which transfers the power via the output shaft 15 to a belt disc or pulley 21 arranged at the free end of the shaft 15, about which a plurality of belts 22 are passed. The belts extend parallel to the drawbar 19 and are passed at the agricultural implement 2 around a pulley arranged on it, said pulley driving the agricultural implement 2 in any manner. The drawbar 19 is adjustable and fixable with respect to the frame of the implement and the pulley of the implement is rotatable about the pivotal line of the drawbar 19 and the implement 2. The pulley 21 is provided with an enlarged flange 21' in order to prevent that the belts run out of the grooves. Additional belt-spanners may be deleted so.

It is finally noted that the carrier 16 is provided with two eyelets 23, to which a chain 24 (see FIG. 1) can be fastened, said chain serving to limit the downward movement of the support 16. Therefore, the lifting arms 3 can be freely moved upwards out of a lowermost position determined by the chain 24.

It will be apparent that the propeller shaft 20 is exposed to minimum wear, since the universal joint at the power take-off shaft and the universal joint 18 will invariably be at the same angle to the shaft 20, said angle being only determined by the vertical setting of the lifting device 3. Since the centre of the joint 18 is located on the pivotal line B—B the propeller shaft 20 will, moreover exhibit no or substantially no variation in length so that the cardanic transmission concerned is subjected to minimum wear. Nevertheless, the agricultural implement 2 can occupy any desired position relative to the tractor 1 and with a great height of the housing 11 the part 12 may even be arranged at such a height above the top point of the tractor that the tractor can pass beneath the drawbar 19. With this transmitting device the drive need not be stopped, because in any position of the implement with respect to the tractor the transmission 13 can remain operative.

FIG. 6 shows a variant of the embodiment described above. Corresponding parts are designated by the same reference numerals. A structural difference resides in that the V-shaped carrier 16 is not arranged in the lower lifting arms of the tractor: instead it is coupled with a bracket 24 so as to be pivotable about the line B—B. The bracket 24 has at the centre a rotary top 25, which has to be inserted into the eyelet of the drawbar of the tractor. Also in this case any freedom of movement is ensured.

The transmitting device shown in FIG. 7 comprises a carrier 30 consisting of a first portion 31 provided on both sides with V-shaped wings 32, the two free ends of which hold a stub shaft 33. In this embodiment the wings 32 and the portion 31 of the carrier 30 together constitute the support which can be arranged in the eyelets of the lower lifting arms of the three-point lift of the tractor. The carrier 30 has furthermore a second portion 34, which is pivotable about the line A—A with respect to the first portion 31.

In the first portion is journalled the input shaft 35, which may be provided in the manner shown in FIG. 4 with a propeller shaft joint. The transmission 36 held in the carrier comprises four interengaging bevel pinions, the intermediate pinions 37 being rotatable about the pivotal line A—A. The output shaft 38 of the transmission is located opposite the input shaft 35 and leads towards the agricultural implement to be attached. In this embodiment the drawbar 39 is coaxical with the driving shaft 38 and rotatably journalled in a sleeve fastened to the portion 34. In an axial sense the drawbar 39 is blocked in the sleeve 40. Also this construction provides an omnidirectional freedom of movement, since the carrier 30 is tiltable about the axis B—B in the lower lifting arms of the tractor, whilst the bar 39 can turn about the line C—C with respect to the second portion 34 of the carrier 30. Thus the implement allows movements in the directions indicated by the arrows P1, P2 and P3 respectively. Power is transferred via the bevel pinion transmission 36 from the input shaft 35 to the output shaft 38, whilst during a turn of the portion 34 about the line A—A the pinions can freely roll one along the other.

It will be obvious that one of the intermediate pinions may be omitted.

FIG. 8 shows a variant of the embodiment of FIG. 7. The same reference numerals designate corresponding parts. The difference is that the two horizontal bevel pinions are fastened to the same shaft, whereas the input shaft 35 is off-set with respect to the output shaft 38.

With this transmission the angular deflection can be larger than in the embodiment of FIG. 7.

The embodiment of FIG. 9 comprises a carrier 50 having a first portion 51, which is rigidly secured to a V-shaped support 52. The V-shaped support is provided in the same manner as in the foregoing embodiments with stub shafts 53, which allow a turn about the line B—B with respect to the lifting device of the tractor. The portion 51 holds the input shaft 54, which is provided with a pulley 55. The carrier has a second portion 56 which is rotatable via the bearings 57 with respect to the portion 51, as a result of which a pivotal movement with respect to the line A—A is allowed. In the second portion 56 is journalled an output shaft 58, which is provided at the front end shown in FIG. 7 with a further pulley 59. The drawbar 60 is rotatably fastened to the portion 56 in the same manner as in the embodiment of FIG. 7 so that a turn about the line C—C is ensured. In this embodiment the transmission consists of a V-rope 61 passed around the pulleys 55 and 59 respectively. In dependence upon the distance between the pulleys 55 and 59 the angle of turn about the line A—A is determined, since in this embodiment the rope 61 is torsioned. Nevertheless, an omnidirectional movability of the device remains possible in the direction of the arrows P1, P2 and P3 respectively.

Figure 10:
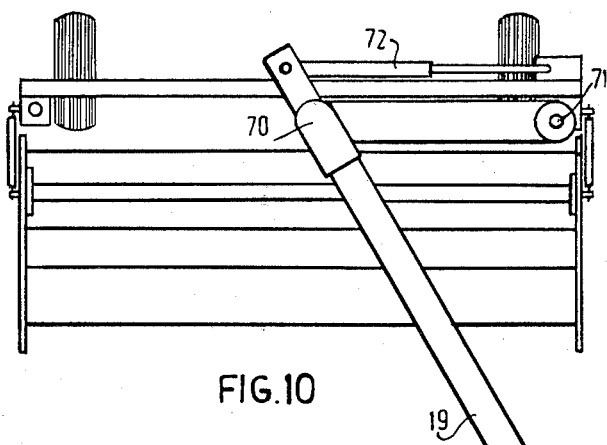

FIG. 10 shows a further variant to connect the drawbar 19 to the agricultural implement. In this embodiment the drawbar 19 is connected in or near the middle of the implement and is pivotable on a vertical axis 70. Around said axis a pulley or the like is driven by the transmission belts 22, whereas said pulley is connected with a similar pulley of a transmission to the maindriveshaft 71 near the side of the implement. The connection in the middle of the implement is advantageous for the limited length of the drawbar when the implement is located at the left or right side of the tractor. Moreover the frame of the implement may be built less heavy than in the embodiment according to FIG. 1. Further the implement will not be drawn askew, what is more manifest on slopes. By means of a cylinder 72 or the like the angle between drawbar and implement may be set.

Figure 11:
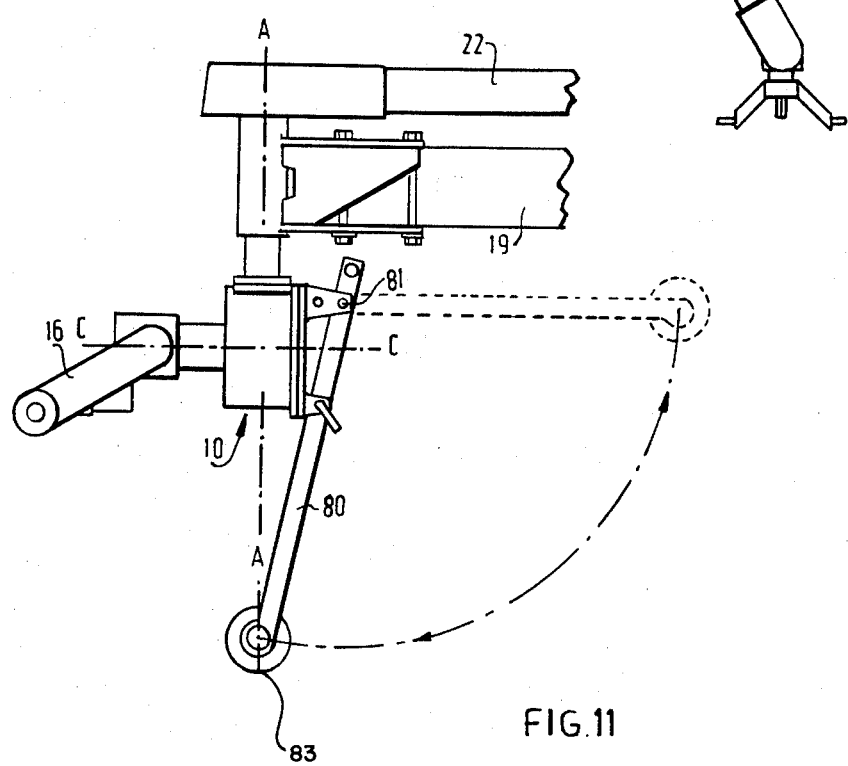

FIG. 11 shows a leg-support 80, which is mounted pivotable to the device 10. A pin 81 will lock said leg in a position as shown, such that the support point of the wheel 83 on the bottom lays on pivot line A—A. In this position the device 10 is freely rotable around said line A—A what facilitate the coupling to the tractor.

The power transferring device according to the invention is easily to adapt to the number of revolutions of the power take-off shaft of the tractor. Thereto the diameter of the pulleys in the belt-transmission along the drawbar 19 might be chosen in such a ratio that the coupled implement will be driven at the desired speed irrespective of the nominal speed of the take-off shaft of the tractor.

What is claimed is:

1. A combined power transmitting and coupling device for connecting a tractor having a power take-off shaft to an implement in order to travel the implement over a field while imparting power to the implement, said device comprising a carrier having first and second portions relatively rotatable about an upstanding axis, said carrier defining a housing for a power transmission means having an input shaft journalled in the first portion of said carrier about an axis aligned with said power take-off shaft, drawbar means for connecting said second portion of the carrier to the implement for imparting travel to the implement as the tractor is driven, and coupling means for pivotally connecting said input shaft to the tractor for movement about a transverse horizontal axis perpendicular to said input shaft.

2. A device as claimed in claim 1 wherein said input shaft includes a universal joint having a center through which said transverse horizontal axis substantially passes.

3. A device as claimed in claim 2 wherein said coupling means comprises pivot pins and said tractor has lower lifting arms including eyelets into which said pivot pins are inserted.

4. A device as claimed in anyone of claim 1-3 characterized in that said first portion of the carrier and said coupling means constitute a single, solid unit.

5. A device as claimed in claim 4 characterized in that the transmission comprises a rope or chain transmission.

6. A device as claimed in anyone of claims 1-3 characterized in that the transmission comprises a right-angle pinion transmission.

7. A device as claimed in claim 6 characterized in that said drawbar means is rotatably journalled on said second portion about an axis perpendicular to said upstanding axis.

8. A device as claimed in anyone of claims 1-3, characterized in that, means are provided for limiting in a vertical and/or horizontal sense the movement of said coupling means.

9. A device as claimed in claim 8, characterized in that said limiting means are adjustable.

10. A device as claimed in claim 8, characterized in that said universal joint of said input shaft is a component part of the propeller shaft arranged between said input shaft and the power take-off shaft of the tractor.

11. A device as claimed in anyone of claims 1-3, characterized in that said coupling device or the front end of the drawbar respectively is provided with support means pivotably connected therewith to facilitate coupling to the tractor.

12. A device as claimed in claim 11, characterized in that said support means is provided with a wheel.

13. A device as claimed in claim 11, characterized in that the bottom support point of said support means lays on said upstanding axis of said coupling device.

14. A device as claimed in claim 1 wherein said drawbar means includes a drawbar having an angle adjustable with respect to said implement.

15. A device as claimed in claim 14, characterized in that said drawbar is connected with the implement so as to be pivotable about a horizontal pivot axis.

16. A device as claimed in claim 15, characterized in that said drawbar is provided with a mechanical transmission having a driving shaft in line with said horizontal pivot axis.

17. A device as claimed in claim 16, characterized in that said horizontal pivot-axis and said driving shaft respectively are located at or near the middle of said implement.

18. A device as claimed in claim 14 characterized in that the said drawbar is connected with the implement so as to be pivotable about a vertical pivot axis.

19. A device as claimed in claim 18 characterized in that said drawbar is provided with a mechanical transmission having a driving shaft in line with said vertical pivot axis.

20. A device as claimed in claim 19, characterized in that said vertical pivot-axis and said driving shaft respectively is located at or near the middle of said implement.

21. A device as claimed in claim 17 or 20 characterized in that said driving shaft forms an intermediate shaft to drive a further driving shaft through a transmission, said further driving shaft being located at the side of said implement.

22. A device as claimed in claim 14, characterized in that said transmission belonging to said drawbar and implement respectively comprise V-belts.

23. A device as claimed in claim 22, characterized in that the diameter of at least the lowest flange of the or each belt-pulley exceeds the diameter of the belt-circumference running in a groove.

* * * * *